Figure 1:
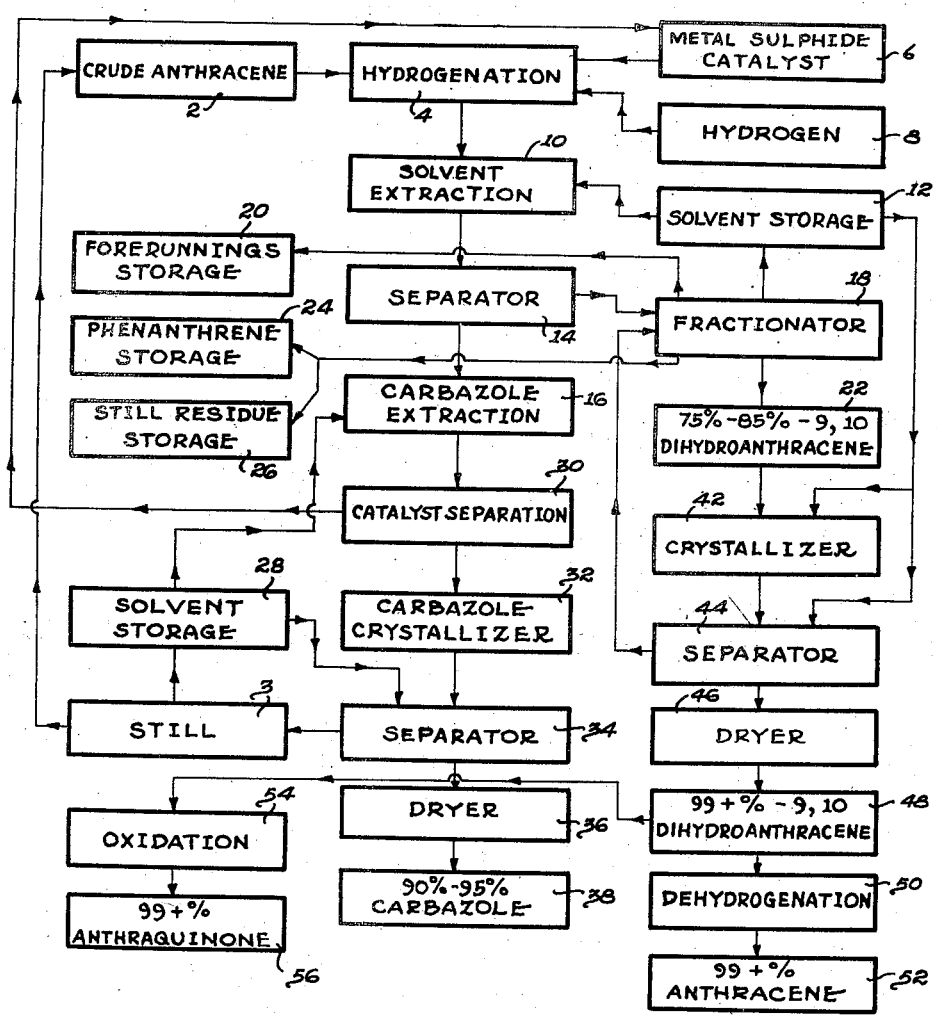

INVENTORS,
BEN BENNETT CORSON, &
ROBERT SHERMAN DETRICK.
their ATTORNEY.

March 23, 1948.　　B. B. CORSON ET AL　　2,438,148
CRUDE ANTHRACENE SEPARATION
Filed Feb. 1, 1945　　2 Sheets-Sheet 2

INVENTORS.
BEN BENNETT CORSON, &
ROBERT SHERMAN DETRICK.
BY Edmund G. Borley
their ATTORNEY.

Patented Mar. 23, 1948

2,438,148

UNITED STATES PATENT OFFICE 2,438,148

CRUDE ANTHRACENE SEPARATION

Ben Bennett Corson and Robert Sherman Detrick, Pittsburgh, Pa., assignors to Koppers Company, Inc., Pittsburgh, Pa., a corporation of Delaware Application February 1, 1945, Serial No. 575,686

9 Claims. (Cl. 260—318)

The present invention relates to the separation and purification of tar constituents and especially to the refining of anthracene.

In the commercial distillation of tar there is obtained a crude anthracene cut, a so-called anthracene-oil fraction, that is usually cooled, filtered, and even pressed hot to yield an anthracene cake comprising about 20–50% anthracene. Besides anthracene, the crude anthracene comprises predominantly carbazole and phenanthrene, the minor constituents including acenaphthene, the various methyl anthracenes, fluorene, chrysene, and acridine. The similarity in such physical properties as boiling points, melting points, and solubilities in various solvents has made it difficult to separate and purify even the predominant constituents by the conventional processes such as caustic fusion, vacuum distillation, and solvent extraction.

More recently, the crude anthracenes have been hydrogenated for protracted periods at high pressures (over 150 atmospheres) and at high temperatures (over 400° C.), with and without catalysts, usually for the sole purpose of recovering carbazole. These conditions produced considerable cracking of the principal constituents, especially anthracene. To reduce this cracking when operating without catalysts it is now considered better practice to hydrogenate for shorter periods (±1 hour). When operating with catalysts at pressures above 100 atmospheres, somewhat lower temperatures, from about 300° C. upwards, have been used. Among the catalysts that have been employed are included the metals, metal sulphides, and difficultly reducible metal oxides of such metals as nickel, cobalt, iron, molybdenum, chromium, tungsten, uranium, vanadium, copper, zinc, tin, manganese, and sodium. Under these conditions the major portion of the carbazole and phenanthrene content of the crude anthracene is not hydrogenated, whereas the anthracene is hydrogenated to various hydrides. The hydrogenated product is thereafter simply cooled and/or treated with solvents to separate first carbazole and then phenanthrene from the liquid hydrogenated anthracene portion. The hydrogenated anthracene is thereafter dehydrogenated and anthracene recovered therefrom. After further purification, the carbazole, phenanthrene, and anthracene obtained by such processes will each have a purity in the range of from 70% to 95%. The recovery of each of these purified products will vary from about 25% to 60% of their original content in the crude anthracene.

Studies in the hydrogenation of pure anthracene with some of the more active of the previously mentioned metal catalysts at atmospheric or slightly elevated pressures and temperatures upward of 150° C., and with the sulphides and oxides of these metals at temperatures upward of 300° C., and pressures upward of 100 atmospheres, show formation of various hydrides, among these being 9,10-dihydroanthracene, tetrahydroanthracene, octahydroanthracenes, and perhydroanthracene.

Very often, it has been shown that reactions taking place with ease with pure anthracene, carbazole, and phenanthrene do not take place as readily when crude products containing these constituents are similarly treated to separate them. It has now been found, however, that by retarded and controlled hydrogenation of even a very crude anthracene having only a relatively low content of the wanted products, that the anthracene present therein can be hydrogenated to yield predominantly only a single hydride, namely, 9,10-dihydroanthracene with substantially no cracking. Furthermore, this hydride can be easily separated from the hydrogenated product and purified. This retarded and controlled hydrogenation is especially applicable to the refining of crude anthracene cake to recover carbazole, phenanthrene, and anthracene therefrom.

The primary object of the present invention is to provide a process for refining crude anthracene to obtain therefrom good yields of highly purified products.

A further object of invention is to provide a process for hydrogenating crude anthracene to obtain a high yield of high quality 9,10-dihydroanthracene.

Another object of invention is to provide a process for separating 9,10-dihydroanthracene, phenanthrene, carbazole, and other minor constituents as highly purified products from hydrogenated crude anthracene.

Yet another object of invention is to provide a hydrogenation process with distillation and solvent extraction for separating constituents of crude anthracene.

Yet a further object of invention is to provide a process for producing highly purified anthraquinone from anthracene oil or other crude tar distillates containing anthracene.

The invention has for further objects such other improvements and such other operative advantages or results as may be found to obtain in the processes or apparatus hereinafter described or claimed.

Figure 2:
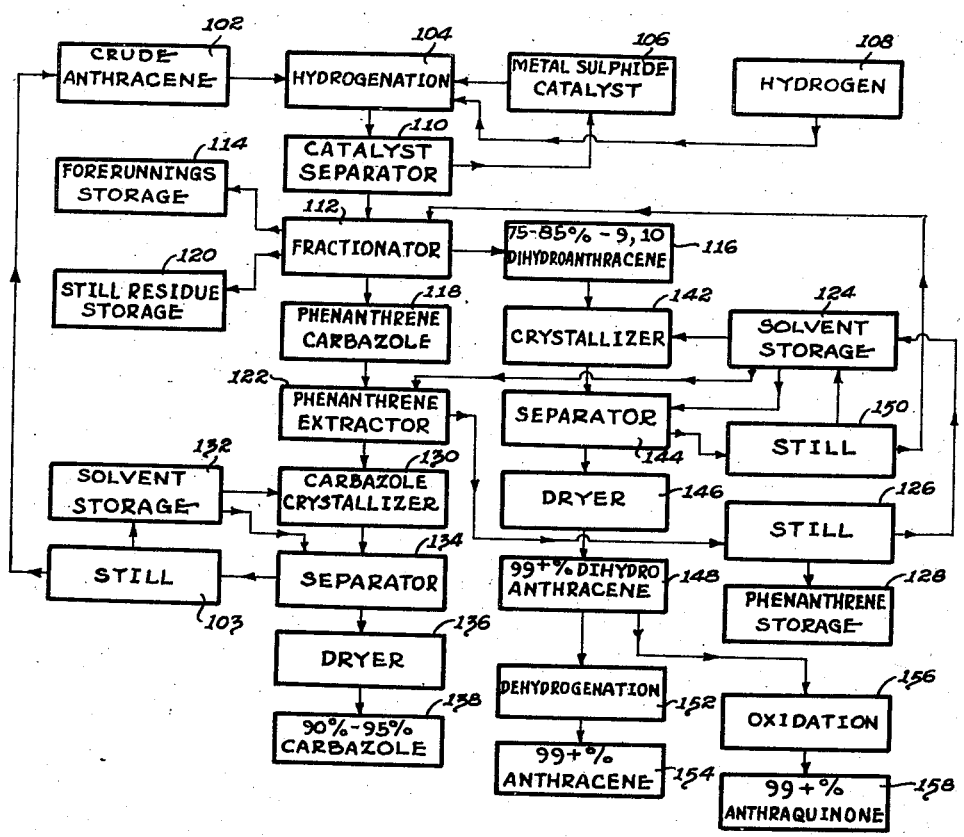

In the accompanying drawings forming a part of this specification and showing for purposes of exemplification preferred methods in which the invention may be embodied and practised but without limiting the claimed invention specifically to such illustrative instances:

Figure 1 is a flow sheet illustrating a combined hydrogenation, solvent extraction, and fractionation process for separating and purifying the constituents of a crude anthracene product; and Figure 2 illustrates an alternative process flow sheet for a hydrogenation step followed by fractionation and then solvent extraction steps for separating and purifying the constituents of a crude anthracene cake. The two flow sheets and the inventions described therein are essentially the same. Each applies a distillation and a solvent extraction to the hydrogenated anthracene cake. It is optional to solvent extract first (Fig. 1) or distill first (Fig. 2).

Referring to the flow sheet of Fig. 1, the crude anthracene from storage 2 augmented by material obtained from a still 3 in a subsequent process step, is transferred to a conventional batch or to a continuous hydrogenation unit 4 and is therein mixed with a metal sulphide hydrogenation catalyst from catalyst storage 6, the mixture being heated under the pressure of hydrogen from hydrogen storage 8 for a period sufficient to convert the anthracene content of the mixture to 9,10-dihydroanthracene. The crude anthracene can be any product containing anthracene in association with other impurities. Usually the crude anthracene comprises a fraction obtained in the distillation of tar, a fraction in the so-called anthracene oil range. This crude anthracene will also comprise carbazole and phenanthrene with smaller concentrations of the homologs of anthracene and phenanthrene, acenaphthene, fluorene, chrysene, and acridine. While the anthracene in such a tar fraction can be selectively hydrogenated, it is usually preferred to concentrate the anthracene, carbazole, and phenanthrene into a so-called anthracene cake by cooling the tar fraction to solidify these high melting constituents, and then to express or otherwise to remove the liquid constituents by some type of filtration. The resulting cake will comprise about 20% to 50% anthracene. The novel hydrogenation is applicable to any crude product containing anthracene. The subsequent separation of constituents from the hydrogenated product will depend on the chemical and physical properties of the constituents associated with the anthracene or the 9,10-dihydroanthracene.

The crude anthracene is mixed with any one of the usual metal sulphide hydrogenation catalysts such as the sulphide or sulphides of nickel, cobalt, molybdenum, chromium, manganese, tungsten, vanadium, tin, etc. The active metal catalysts have been employed for the hydrogenation of coal-derived products, yet for the purpose of the present invention they are too active, since they bring about unwanted hydrogenation of the carbazole and phenanthrene and convert the wanted 9,10-dihydroanthracene to higher hydrides. On the other hand, the action of the metal sulphide catalysts in general is mild and controllable. It is preferred to employ about 10% by weight of catalyst, the quantity being variable, for example, the smaller the quantity of catalyst, the temperature and pressure being constant, the longer the time required to obtain comparable results. As between the various metal sulphide catalysts, it is usually possible to compensate for variations in catalytic activity by varying the time of treatment.

It should be pointed out that an anthracene cake always contains sufficient sulphur products to convert the aforementioned metals, their oxides and salts, such as the chlorides, phosphates, carbonates, etc., to the metal sulphides under the proposed novel operating conditions. Thus, for purposes of the present invention, when hydrogenating crude anthracene cake, a metal sulphide hydrogenation catalyst may be employed which is prepared as such by known means, or the metal sulphide may be prepared in situ from the metals, their oxides or their salts.

For controlled hydrogenation, it is preferred to employ a temperature below 350° C. and within the range of 250° C. to 350° C. Pressures below 100 atmospheres, and preferably between 20 and 100 atmospheres have been found to retard the reaction beneficially and are most satisfactory for hydrogenating crude anthracene to 9,10-dihydroanthracene. A number of important benefits are obtained by the use of these novel operating conditions. Thus, a maximum conversion of the anthracene to 9,10-dihydroanthracene is thereby achieved, with a minimum conversion thereof to the higher hydrides, regardless of the presence of other constituents in the crude anthracene cake. The hydrogenation and/or decomposition of carbazole and phenanthrene are largely eliminated. Furthermore, hydrogenation periods in excess of the necessary hydrogenation time do not cause conversion of the wanted 9,10-dihydroanthracene to unwanted higher hydrides at these low pressures, contrary to the prior art experience.

At median pressures of from 40 to 60 atmospheres, within the specified limits for temperature, and depending upon the type of catalyst, the catalyst concentration and the concentration of other materials in the crude anthracene, the preferred hydrogenation is usually completed in from 4 to 6 hours. Thus, from an anthracene cake comprising 25% to 30% anthracene and under the above-mentioned conditions, about 80% of the anthracene is obtained as a relatively pure 9,10-dihydroanthracene.

Under the preferred conditions of time, temperature, catalyst, and catalyst concentration, but at pressures over 100 atmospheres, the 9,10-dihydroanthracene production is reduced. This compound, or perhaps even the anthracene, is converted to higher hydrides, largely tetrahydroanthracene, that are not oxidizable directly to anthraquinone as is the 9,10-dihydroanthracene.

After the hydrogenation step of the crude anthracene, the major constituents of the hydrogenation product can be separated alternatively by process steps that begin with a solvent extraction or with a fractionation step. If the solvent extraction is used first, the hydrogenation product is treated in an extractor 10 with solvent from storage 12 that selectively removes the 9,10-dihydroanthracene and phenanthrene. Various solvents can be employed, it being preferred to use aliphatic solvents such as the aliphatic petroleum solvents and alcohols. However, the naphthenes are also good solvents. For example, refined petroleum solvents (B. P. 60°–150° C.), methyl, ethyl, and iso-propyl alcohols, cyclohexane and methyl cyclohexane are excellent solvents. The treated mixture goes to a separator 14 that can be a filter, a centrifuge, or the like, the insoluble carbazole going to a carbazole extractor 16, whereas the solute is flowed to a fractionator 18, to be distilled, preferably at reduced pressures to minimize the dehydrogenation of 9,10-dihdroanthracene to anthracene. Usually the separated fractions from a distillation are distributed as follows: solvent to solvent storage 12, forerunnings to storage 20, 9,10-dihydroanthrancene to storage 22, 70–85% phenanthrene to storage 24 and the still residue to storage 26. The forerunnings in 20 and the still residue in 26 can be blended with other tar fractions or accumulated for the separation therefrom of fluorene, acenaphthene, and the like. The purity of the phenanthrene can be raised by known methods, for example, by recrystallization from the above-named solvents. The crude carbazole in extractor 16 can be extracted, preferably with a heated aromatic solvent such as coal tar naphtha, xylene, pyridine, or the like, from solvent storage 28. The insoluble catalyst is first separated in a separator 30 and is then recycled for further use to catalyst storage 6. On cooling and crystallizing in a crystallizer 32, the purified carbazole crystals are separated from mother liquor in a separator 34, washed therein with the solvent from storage 28, and after drying in a dryer 36 go to storage 38, as carbazole having a purity of 90% to 95%. By repeatedly crystallizing this carbazole product as described it is possible to produce substantially pure carbazole. From the separator 34, the mother liquor containing anthracene, carbazole, 9,10-dihydroanthracene, etc., is distilled in still 3, the solvent therefrom being returned to solvent storage 28, whereas the residue is recycled to crude anthracene storage 2 for reworking.

The 9,10-dihydroanthracene in storage 22 has a purity of 75% to 85% that can usually be easily raised to a purity of over 99% by a single recrystallization in a crystallizer 42 from a solvent obtained from storage 12. The crystals from a crystal separator 44, after being washed with solvent from storage 12, go to a dryer 46, whereas the mother liquor from separator 44 is recycled to the fractionator 18 to separate its constituents. From the dryer 46, the 9,10-dihydroanthracene having a purity of better than 99% goes to a storage 48. The 9,10-dihydroanthracene can easily be dehydrogenated in a dehydrogenation apparatus 50 by known means, for example, by treatment with sulphur, to yield anthracene of over 99% purity. Alternatively, this substantially pure 9,10-dihydroanthracene in storage 48 can go through an oxidation step in an oxidizer 54 by known means, for example, by oxidation with chromic acid to produce anthraquinone in storage 56 having a purity of over 99%, that is suitable for use in the dye industry. The 9,10-dihydroanthracene in storage 22 can obviously be dehydrogenated to anthracene or oxidized to anthraquinone. However, where highly purified products are required, it is preferred to purify the 9,10-dihydroanthracene rather than to purify either of the conversion products.

Referring to the flow sheet of Figure 2, the crude anthracene from storage 102, including the recycled still residue from a still 103, is transferred to a hydrogenation apparatus 104, and is therein admixed with a metal sulphide dehydrogenation catalyst from storage 106, the mixture being heated under the pressure of hydrogen from storage 108 for a period sufficient to convert a major portion of the anthracene content of the mixture to 9,10-dihydroanthracene. This operation is similar to the hydrogenation of anthracene as described with reference to Figure 1. The hydrogenated product flows from hydrogenation apparatus 104 to a catalyst separator 110, where the insoluble catalyst is filtered or otherwise separated from the hot, liquid product, the separated catalyst being recycled to storage 106 for further use, whereas the hydrogenated product flows to a fractionator 112 for separation of its constituents, preferably at a subatmospheric pressure, to reduce both the dehydrogenation of 9,10-dihydroanthracene to anthracene and tar formation. From a very crude starting material the usual four fractions from a fractionator 112 are forerunnings to storage 114, the 9,10-dihydroanthracene product to storage 116, a phenanthrene-carbazole mixture to storage 118 and the still residue to storage 120. The forerunnings and still residue can be further fractionated or otherwise treated to separate therefrom other minor constituents present with the crude anthracene. It is also possible, simply to distill off any forerunnings with the 9,10-dihydroanthracene and to purify the 9,10-dihydroanthracene found therein. The still residue now comprising carbazole, phenanthrene, etc., is then solvent extracted as described.

Where the anthracene is present in a close-boiling tar fraction or where the impure anthracene is derived otherwise than from tar, it is possible, after a hydrogenation step to distill off the 9,10-dihydroanthracene substantially unchanged at ordinary pressures. The other constituents remain as still residue. Relatively pure 9,10-dihydroanthracene can be distilled at ordinary pressures without change. However, when crude anthracene as an anthracene oil or anthracene cake is sufficiently hydrogenated and then distilled at atmospheric pressure, the yield of 9,10-dihydroanthracene is low. Something that is present in the crude product tends to bring about the dehydrogenation of the 9,10-dihydroanthracene to anthracene. It was found that when the 9,10-dihydroanthracene was distilled at reduced pressures, for example, at about 50 mm. substantialy no dehydrogenation resulted.

However, where carbazole is present with the 9,10-dihydroanthracene and is also to be distilled, it is preferred for carbazole distillation to increase the pressure to over 150 mm., after the 9,10-dihydroanthracene has been removed at about 50 mm. Distillation of the hydrogenated anthracene cake at 150 mm., causes some dehydrogenation of the 9,10-dihydroanthracene. The reason for the use of two different pressures is that at 50 mm. the boiling temperature of the carbazole is lower than its melting point. Therefore, instead of distilling over, the carbazole sublimes and thus tends to plug the distillation apparatus.

The phenanthrene-carbazole mixture from storage 118 flows to a phenanthrene extractor 122, wherein solvent from storage 124 selectively dissolves phenanthrene from carbazole, the extract flowing to a still 126 for separation of the solvent that is returned to storage 124, the residue flowing to a storage tank 128. The phenanthrene product in tank 128 usually has a purity of 70% to 85%. The solvent here as for the operation described in Figure 1 can be an aliphatic solvent or even a naphthene, for example, a petroleum solvent, an alcohol or a naphthene such as cyclohexane. From the extractor 122 the carbazole goes to a crystallizer 130 for further purification.

At this point in the process system the separated products are essentially the same as are those obtained in Figure 1. They are similarly disposed of as regards the forerunnings in storage 114, the still residue in storage 120 and the phenanthrene in storage 128. The carbazole in a crystallizer 130 and the 9,10-dihydroanthracene in a storage tank 116 are essentially the same products as are obtained in Figure 1, and they are purified in like manner.

Thus, the carbazole in a crystallizer 130 is crystallized from a solvent solution made with a solvent such as naphtha, xylene, pyridine, and the like, drawn from storage tank 132, the crystals in a separator 134 being washed with additional solvent from tank 132, then being dried in a dryer 136 to give a carbazole in tank 138 of 90% to 95% purity. The separated mother liquor from the separator 134 goes to a still 103 for recovery of solvent that flows to solvent storage 132, whereas the still residue is recycled to the crude anthracene storage tank 102 for reworking.

The 9,10-dihydroanthracene in tank 116 has a purity of 75% to 85% that is raised in a crystallizer 142 by treatment with a solvent from tank 124, the crystals in the separator 144 being washed with fresh solvent from tank 124 and then being dried in a dryer 146 to give a 9,10-dihydroanthracene stored in tank 148 having a purity of over 99%. The mother liquor from the separator 144 goes to a still 150 for separation of solvent that flows to solvent storage 124, the residue flowing to the fractionator 112 for reworking.

The substantially pure 9,10-dihydroanthracene in tank 148 can alternatively go through a dehydrogenation step in a dehydrogenation apparatus 152 for conversion to anthracene stored in tank 154 or through an oxidation step in an oxidation apparatus 156 for conversion to anthraquinone stored in a tank 158 by the methods described for Figure 1.

The present invention is one of great economic importance because of the high recovery and purity of the anthracene recovered. It has been demonstrated that at pressures of from 20 to 100 atmospheres and usually within the range of 40 to 60 atmospheres, the anthracene present even in small proportions in a crude product can be selectively hydrogenated to substantially only 9,10-dihydroanthracene. This mild, slow and selective hydrogenation can be effected in less expensive low pressure equipment than is required by the prior art. The process also leaves the carbazole and phenanthrene substantially unchanged. Furthermore, when starting with a solid anthracene cake, the hydrogenated product therefrom contains a minimum of liquefied, aromatic hydrogenated material that would dissolve the valuable carbazole and carry it away in any subsequent solvent extraction step. With this hydrogenation process the recovery of carbazole has been raised appreciably from the maximum heretofore obtained by the processes of the prior art.

The 9,10-dihydroanthracene formed in the selective hydrogenation reaction and present in a complex, crude fraction possesses physical properties that simplify not only its separation but also that of the carbazole and phenanthrene from any crude tar fraction. It is a heat-stable product with a boiling point of 313° C. that is sufficiently below that of carbazole and phenanthrene to permit separation by distillation of the crude material. As compared to anthracene, which forms flocculent crystals that occlude impurities and make its purification difficult, as well as contaminating the carbazole and the phenanthrene during their crystallization, the 9,10-dihydroanthracene forms crystals that are remarkably free of other impurities. For example, the first-separated product has a purity of 75% to 85% which by a single recrystallization from appropriate solvents can be purified in good yields to 9,10-dihydroanthracene, having a purity of over 99%. The ability of remove the 9,10-dihydroanthracene efficiently from the crude hydrogenated product makes it possible to obtain higher yields of purer carbazole and phenanthrene, and also simplifies their purification, where required, to the pure products. Additionally, it simplifies the concentration and preparation of the minor constituents such as the acenaphthene, fluorene, etc.

By hydrogenating the anthracene to 9,10-dihydroanthracene, the solvent selectivity of the product is changed remarkably and advantageously for separation from crudes. The 9,10-dihydroanthracene is relatively soluble in so-called aliphatic type solvents such as petroleum solvents and alcohols, as well as naphthenes, that permit a rapid, sharp separation from carbazole. Anthracene, on the other hand, is soluble along with carbazole in aromatic solvents, thus making separation therebetween difficult.

The disclosed methods for handling the 9,10-dihydroanthracene are of course generally applicable to the handling of hydrogenated crude anthracene, regardless of the nature or source of the original crude or of the conditions such as temperature, pressure, catalyst, time, etc., employed for hydrogenating a crude anthracene.

The high purity of the 9,10-dihydroanthracene makes it an easy matter to use known reactions to convert it to anthracene and anthraquinone of equally high purity. It is also a preferred material for further hydrogenation to the higher hydrides. In the production of anthraquinone suitable for use in the dye industry, the usual 90% pure anthracene of commerce is treated, for example, with chromic acid to produce anthraquinone. However, because of the impurities present in the original anthracene, the resulting product must be treated with between five and ten times its weight of concentrated sulphuric acid, followed by dilution and sublimation to obtain a suitable, pure anthraquinone. These expensive process steps are eliminated, where the 9,10-dihydroanthracene is directly oxidized to anthraquinone or is first dehydrogenated to anthracene and the anthracene oxidized to anthraquinone. In this connection a reaction velocity study showed that the 9,10-dihydroanthracene oxidized to anthraquinone in an aqueous solution of chromic acid nearly twice as rapidly as did anthracene.

The following specific examples are illustrative of the results obtainable in the practice of the present invention. All quantities are in parts by weight unless otherwise designated.

*Example 1*

According to the procedure described with reference to Figure 1, there was hydrogenated in a shaking autoclave for five hours at 300° C. and under an average hydrogen pressure of 600 p. s. i. (about 41 atmospheres), a mixture of 90 parts NiS catalyst, 900 parts anthracene cake and 110 parts recycle still residue from a previous run. The anthracene cake analyzed 33.2% anthracene and 18.9% carbazole, the remainder being phenanthrene and other materials boiling in the anthracene oil range. The still residue analyzed 21% anthracene and 29% carbazole. The hydrogenated cake was extracted with Skelly Solve B, a commercial type of refined petroleum solvent (B. P. 60°–71° C.) to dissolve out 9,10-dihydroanthracene and phenanthrene. The remaining cake was dissolved in xylene and the carbazole recovered therefrom in a 63.3% yield of a product having a purity of 91.8%. The Skelly Solve solution was fractionated at 42 mm. pressure, a fluorene cut (B. P. 178°–190° C.) and the 9,10-dihydroanthracene cut (B. P. 190°–200° C.) distilling over. The still residue comprised about 70% phenanthrene, which on treatment with ethyl alcohol yielded a phenanthrene of 85–90% purity. The 9,10-dihydroanthracene cut (78.8% purity) represented 77.8% of the theoretical recovery. A single recrystallization from ethyl alcohol yielded 9,10-dihydroanthracene having a purity of over 99%.

Comparison runs were made in a manner similar to that hereinabove described with the same crude anthracene cake and the same quantity of NiS catalyst. However, the temperature, time, and hydrogen pressure were each varied to determine the effect thereof on the yield of 9,10-dihydroanthracene from the same crude anthracene cake. The purity of all products was raised to over 99% 9,10-dihydroanthracene upon recrystallization. The results of the runs are tabulated below.

| Run No. | Temp., °C. | Pressure, lbs./sq. in. | | Time in Hours | Yield of 9, 10-Dihydroanthracene | |
|---|---|---|---|---|---|---|
| | | Ave. | Max. | | Per cent of Anthracene in crude | Purity, Per cent |
| 1 | 300 | 600 | 660 | 5 | 77.8 | 78.8 |
| 2 | 275 | 600 | 700 | 5 | 79 | 86.1 |
| 3 | 300 | 600 | 660 | 10 | 75 | 79.5 |
| 4 | 275 | 1,330 | 1,500 | 5 | 73.8 | 86.2 |

Comparing runs 1 and 2, the change in temperature from 300° C. to 275° C. appears to be beneficial in that there is an increase in the yield and purity of the 9,10-dihydroanthracene. Comparing runs 1 and 3, the change in time from 5 hours to 10 hours while not beneficial brings about only a small decrease in yield of 9,10-dihydroanthracene. This is very important, for in the prior art, such excess hydrogenation time reduced the yields appreciably. In run 4 at 90–100 atmospheres there is a further small decrease in yield of 9,10-dihydroanthracene although the product is somewhat purer.

Yet another run was made in a manner as hereinabove described with a somewhat purer anthracene cake comprising 59.4% anthracene, and 20.3% carbazole. The five-hour run with 10% NiS catalyst was made at 300° C. and at a pressure of 600 lbs. per square inch with 700 lbs. per square inch maximum. The carbazole (92.0% pure) recovery was 80.6% of theoretical, while the 9,10-dihydroanthracene (99.2% pure) was 78.2% of theoretical. Both yields and purity were improved over those obtained with a cruder anthracene cake.

*Example 2*

To determine the yields and purity of anthracene obtainable by dehydrogenating 9,10-dihydroanthracene with sulphur, there were heated 50 grams 9,10-dihydroanthracene (99.5% pure) with a molecular equivalent of sulphur (9 grams) for one hour at 225° C. The contents of the flask were extracted once with 600 cc. hot xylene and the formed crystals washed with 200 cc. cold xylene. Three more batches of 50 grams 9,10-dihydroanthracene were dehydrogenated with sulphur as previously described, the anthracene in each instance being extracted with the same recycled xylene. From the four runs there was recovered 91.3% anthracene (99.7% pure). The xylene was distilled and the remaining 7.3% anthracene (90% pure) recovered to give an overall recovery of 98.6% of the theoretical.

*Example 3*

To determine the yields and purity of anthraquinone obtainable by oxidizing 9,10-dihydroanthracene with chromic acid there were added to a flask 100 grams pulverized 9,10-dihydroanthracene (over 99% pure) produced in accordance with this process and 350 ml. of 72.4% $Na_2Cr_2O_7$ solution. The flask was heated to 100° C. with stirring of contents and a solution of 375 ml. of concentrated sulphuric acid in one liter of water added through a dropping funnel. The acid was added over a period of two hours and the oxidation continued for an additional eight hours. The contents of the flask were filtered, the filter cake washed, dried and then extracted with xylene. Without recycling the xylene for further recovery of product there was obtained an 86.8% yield of theoretical of anthraquinone (melting 282°–283° C.) that was suitable for use in dye manufacture.

*Example 4*

According to the procedure described with reference to Figure 2, there was hydrogenated for five hours at 300° C. and under a hydrogen pressure maintained between 600 and 800 p. s. i. (about 41 to 55 atmospheres), a mixture of 50 parts NiS catalyst, 500 parts anthracene cake and 50 parts recycle still residue from a previous run. The anthracene cake and still residue analyzed about the same as in Example 1. A portion of the hydrogenated product after separating the NiS catalyst was distilled at 150 mm. pressure to distill over 9,10-dihydroanthracene, that was recovered from petroleum solvent in a 57% yield of 9,10-dihydroanthracene (99 plus percent pure). The other portion of the hydrogenated product that was distilled at 20 mm. pressure gave a 75.3% yield of 9,10-dihydroanthracene (99 plus percent pure). The decreased yield of about 18% at the higher pressure was believed due to an impurity induced dehydrogenation of the 9,10-dihydroanthracene to anthracene. The combined still residue comprising a carbazole-phenanthrene cut was extracted with petroleum solvent to separate phenanthrene. The remaining carbazole product when treated with xylene was recovered as carbazole (91.% pure) in a 56.8% yield of theory.

The invention as hereinabove set forth is embodied in particular form and manner but may be variously embodied within the scope of the claims hereinafter made.

We claim:

1. A process for refining anthracene cake containing anthracene, carbazole and phenanthrene comprising: hydrogenating anthracene cake in the presence of metallic sulfide hydrogenation catalyst at a temperature of 275° to 300° C. and a pressure of 40 to 60 atmospheres for a time period to obtain a maximum conversion of anthracene to 9,10-dihydroanthracene, filtering catalyst from the hydrogenation products, distilling hydrogenation products to separate 9,10-dihydroanthracene and phenanthrene and extracting carbazole from the distillation residue with a low boiling aromatic hydrocarbon.

2. A process for refining anthracene cake containing anthracene, carbazole and phenanthrene comprising: hydrogenating anthracene cake in the presence of a metallic sulfide hydrogenation catalyst at temperatures of 275° to 300° C. and pressures of 40 to 60 atmospheres for a period of time to obtain a maximum yield of anthracene to 9,10-dihydroanthracene, filtering the catalyst from the hydrogenation products, distilling the hydrogenation products under a high vacuum pressure to separate 9,10-dihydroanthracene, continuing the distillation under a reduced vacuum pressure to separate phenanthrene, and extracting carbazole from the distillation residue with an aromatic solvent.

3. A process for refining anthracene cake containing anthracene, carbazole and phenanthrene comprising: hydrogenating anthracene cake in the presence of a metallic sulfide hydrogenation catalyst at a temperature of 275° to 300° C. and a pressure of 40 to 60 atmospheres for a time period to obtain a maximum conversion of anthracene to 9,10-dihydroanthracene, filtering the catalyst from the hydrogenation products and distilling the hydrogenation products under a comparatively high vacuum pressure to recover a comparatively pure 9,10-dihydroanthracene.

4. A process for refining anthracene cake containing anthracene, carbazole and phenanthrene comprising: hydrogenating anthracene cake in the presence of a metallic sulfide hydrogenation catalyst at a temperature of 275° to 300° C. and a pressure of 40 to 60 atmospheres for a time period to obtain a maximum yield of anthracene to 9,10-dihydroanthracene, filtering the hydrogenation products to remove catalyst, distilling the hydrogenation products to separate phenanthrene therefrom and extracting carbazole from the hydrogenation residue by solvent extraction.

5. A process for refining anthracene cake containing anthracene, carbazole and phenanthrene comprising: hydrogenating anthracene cake in the presence of a metallic sulfide hydrogenation catalyst at a temperature of 275° to 300° C. and a pressure of 40 to 60 atmospheres for a time period to obtain a maximum yield of 9,10-dihydroanthracene, separating catalyst from the hydrogenation products, distilling under a comparatively high vacuum the hydrogenation products to separate 9,10-dihydroanthracene as an overhead product, and continuing the distillation under a reduced vacuum pressure to separate the phenanthrene from the hydrogenation products.

6. A process for refining anthracene cake containing anthracene, carbazole and phenanthrene comprising: hydrogenating anthracene cake in the presence of a metallic sulfide hydrogenation catalyst at a temperature of 275° to 300° C. and a pressure of 40 to 60 atmospheres for a time period to obtain a maximum yield of 9,10-dihydroanthracene, separating catalyst from the hydrogenation products, distilling under a comparatively high vacuum the hydrogenation products to separate 9,10-dihydroanthracene as an overhead product, and chemically dehydrogenating the 9,10-dihydroanthracene to recover a purified anthracene.

7. A process for refining anthracene cake containing anthracene, carbazole and phenanthrene comprising: hydrogenating anthracene cake in the presence of a metallic sulfide hydrogenation catalyst at a temperature of 275° to 300° C. and a pressure of 40 to 60 atmospheres for a time period to obtain a maximum yield of 9,10-dihydroanthracene, separating catalyst from the hydrogenation products, distilling under a comparatively high vacuum the hydrogenation products to separate 9,10-dihydroanthracene as an overhead product, and dehydrogenating the 9,10-dihydroanthracene with sulfur to recover a purified anthracene.

8. A process for refining anthracene cake containing anthracene, carbazole and phenanthrene comprising: hydrogenating anthracene cake in the presence of a metallic sulfide hydrogenation catalyst at a temperature of 275° to 300° C. and a pressure of 40 to 60 atmospheres for a time period to obtain a maximum yield of 9,10-dihydroanthracene, separating catalyst from the hydrogenation products, distilling under a comparatively high vacuum the hydrogenation products to separate 9,10-dihydroanthracene as an overhead product, recrystallizing the 9,10-dihydroanthracene with an aliphatic alcohol solvent, and dehydrogenating the recrystallized product with sulfur to obtain a purified anthracene.

9. A process for refining anthracene cake containing anthracene, carbazole and phenanthrene comprising: hydrogenating anthracene cake in the presence of a metallic sulphide hydrogenation catalyst at a temperature of 275° to 300° C. and a pressure of 40 to 60 atmospheres for a time period to obtain a maximum yield of 9,10-dihydroanthracene, separating the catalyst from the hydrogenation products, distilling the hydrogenation products under a vacuum to separate a 9,10-dihydroanthracene cut and a separate cut containing carbazole and phenanthrene, and separating the carbazole from the phenanthrene by solvent extraction.

BEN BENNETT CORSON.
ROBERT SHERMAN DETRICK.

REFERENCES CITED

The following references are of record in the file of this patent:

UNITED STATES PATENTS

| Number | Name | Date |
| --- | --- | --- |
| 1,591,712 | Lewis | July 6, 1926 |
| 1,897,798 | Guthke | Feb. 14, 1933 |
| 1,939,224 | Pretzsch | Dec. 12, 1933 |
| 1,940,065 | Spannagel et al. | Dec. 19, 1933 |
| 1,965,956 | Dunkel et al. | July 10, 1934 |
| 1,972,157 | Miller | Sept. 4, 1934 |
| 1,999,738 | Pier et al. | Apr. 30, 1935 |

FOREIGN PATENTS

| Number | Country | Date |
| --- | --- | --- |
| 687,957 | France | May 5, 1930 |
| 733,704 | France | July 18, 1932 |
| 813,647 | France | Mar. 1, 1937 |

OTHER REFERENCES

Padova, Annales de Chemie (8), 19, 432 (1910).
Prokopets, Chemical Abstracts, vol. 33, page 1717 (1939).
Kosaka et al., Chemical Abstracts, vol. 35, page 5108 (1941).